No. 635,136. Patented Oct. 17, 1899.
R. IRVING.
FASTENING FOR STALL CHAINS.
(Application filed Feb. 20, 1899.)
(No Model.)
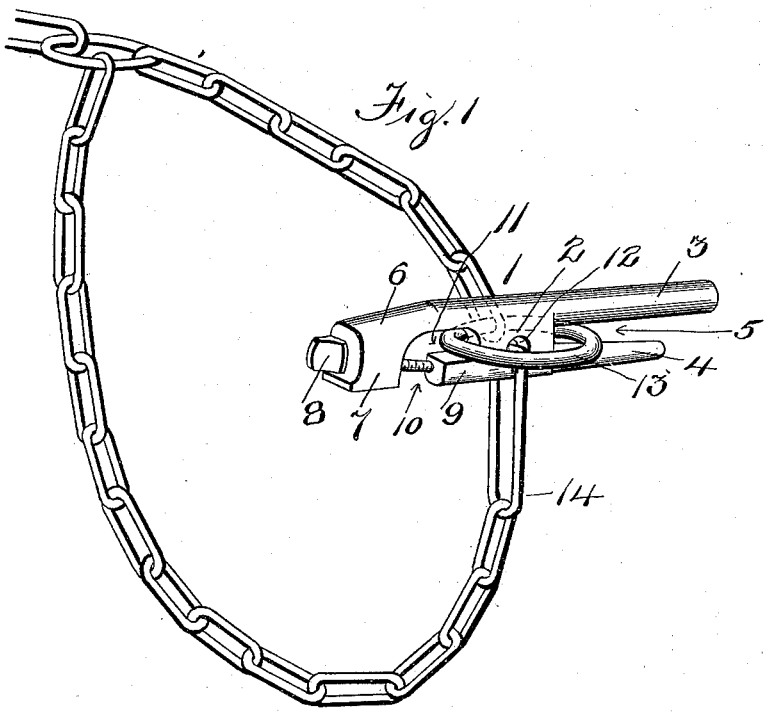
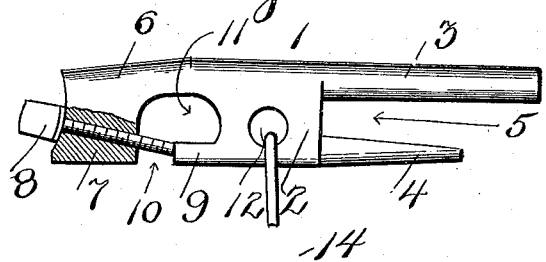
Witnesses
Robert Irving, Inventor,
By Marion Marion
his Attorneys.

UNITED STATES PATENT OFFICE.

ROBERT IRVING, OF CORWHIN, CANADA.

FASTENING FOR STALL-CHAINS.

SPECIFICATION forming part of Letters Patent No. 635,136, dated October 17, 1899.

Application filed February 20, 1899. Serial No. 706,251. (No model.)

*To all whom it may concern:*

Be it known that I, ROBERT IRVING, a subject of Her Majesty the Queen of Great Britain, residing at Corwhin, county of Wellington, Province of Ontario, Canada, have invented certain new and useful Improvements in Fastenings for Stall-Chains; and I do hereby declare the following to be a full, clear, and exact description of the invention, such as will enable others skilled in the art to which it appertains to make and use the same.

My invention relates to improvements in fastenings for stall-chains.

The object of my invention is to provide a device of this character by means of which the stall-chain after being placed in position around the neck of the animal cannot be accidentally moved from such position, the construction being such that unless a set-screw is rotated such chain cannot be moved from the position in which it is placed.

A further object is to provide a device which is neat and attractive in appearance, durable in construction, simple and efficient in operation, and which can be made at a small cost.

To these and other ends my invention consists in the improved construction and combination of parts hereinafter described, and particularly pointed out in the appended claims.

In the drawings, in which similar numerals of reference indicate similar parts in both of the views, Figure 1 is a perspective view showing my improved fastening in position. Fig. 2 is an elevation of the same, a portion being shown in section for better illustration of the construction.

In securing animals to their stalls several different forms of fastenings have been heretofore used, the common form being that of a bar pivotally connected to the last link of the chain, this bar being adapted to be passed through a suitable ring, the bar being intended to prevent the taking out of the bar from the ring by accident. This form of fastening is the least expensive; but numerous disadvantages arise from its use, among which are to be found the fact that the animal so secured is liable to move the head in such manner as to cause the bar to be released, thus releasing the animal from the stall and chain to which it is secured. In obviating these and other disadvantages which have arisen in the use of such bars I have used the general principle of a bar extending across the ring at right angles to the direction of the chain which forms the connection between said bar and the remaining portion of the halter, but have so modified it as to absolutely prevent any liability of removal, excepting by the manipulation of a set-screw, which can only be done by the proper person, the animal being prevented from releasing itself by reason of the construction and operation of the fastening-bar.

1 designates my improved fastener, comprising the shank portion 2, from which extends projections 3 and 4 at one end of said shank portion, said projections forming bars and also forming a recess 5 between said projections, as best shown in the drawings. The projection 3 extends to a greater distance than the projection 4, the latter having its inner surface inclined, as shown, by means of which the ring hereinafter described can be more easily placed in position, as will presently appear. The opposite end of the shank is provided with an extending portion 6, having a lateral extension 7, within which is removably secured a set-screw 8, the inner end of said set-screw being adapted to contact with the outer end of a projection 9, formed on the end of said shank on a plane with the projection 4, the space between the end of the projection 9 and the portion 7 forming an opening 10, leading to a recess 11, as shown.

The shank portion 2 is provided with an opening 12, by means of which the chain or rope is secured to the fastening-bar 1.

In describing the operation of the bar I will do so in connection with the method of fastening, as shown in Fig. 1, in which case the bar is supposed to be secured to a ring connected to a chain having a connection with the stall-chain. With the parts shown in the position of Fig. 1, this position being where the animal is secured, to release the bar the set-screw 8 is unscrewed and the shank portion moved toward the right, which allows the portion of the ring 13 shown on the left side of the shank to pass upward through the opening 10, this end of the bar being raised to cause the bar to pass from the ring.

When this is done, it will be found that the bar is extending in a vertical position, the ring being located within the recess 5 between the projections 3 and 4. The bar is now raised, which effects a removal of the ring 13 from the recess 5, after which the bar is passed downward through the ring, thus releasing the animal.

When it is desired to secure the animal, the bar is passed outward through the ring, carrying with it the chain or rope 14, until the entire bar has passed through said ring. The bar is then placed on the ring, the ring passing into the recess 5 to its greatest extent, which allows the left end of said bar to pass down over the ring, the ring passing through the opening 10 into the recess 11, after which the set-screw 8 is screwed into position and the animal is secured to the ring. While I have shown the fastening as used in this manner, it is to be understood, of course, that the same may be used in other ways, such as to secure the bar to either one of a series of rings secured onto the chain itself, the fastening in this case being by passing the bar through an opening in the stall and then backward over the top of the stall and into one of the rings, being secured therein in the manner shown in the drawings.

The advantages of this construction are many, including the absolute prevention of accidental removal from its securing position, the ease with which it can be secured in position or removed therefrom, its durability, and the exceedingly low cost of manufacture, the bar herein shown possessing the same qualities that are shown in the ordinary bar or in the use in a snap-hook, in addition to which are the advantages herein set forth.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

Having thus described my invention, what I claim as new is—

1. A fastening-bar for chains, having recesses to receive and retain a removable attaching-ring; and means for retaining said attaching-ring within said recesses, substantially as described.

2. A fastening-bar for chains, having a series of recesses formed therein, said recesses being adapted to receive and retain a removable fastening-ring; and a set-screw, mounted to close one of said recesses, said set-screw being adapted to secure said ring in its operative position within said recesses, substantially as described.

3. A fastening-bar for chains, comprising a shank portion, having one of its ends bifurcated, to form a recess, and having its opposite end provided with a recess, said recesses being adapted to receive and retain a removable fastening-ring; and means for closing the inlet-opening to one of said recesses, when said fastening-ring is in position, substantially as described.

4. A fastening-bar for chains, having one of its ends bifurcated, to form a recess, and having a recess formed at its opposite end, said recesses being adapted to receive and retain the fastening-ring; and a set-screw, mounted in said shank portions, said set-screw being adapted to close one of said recesses, to prevent the removal of said fastening-ring when in its operative position, substantially as described.

In witness whereof I have hereunto set my hand in the presence of two witnesses.

ROBERT IRVING.

Witnesses:
WM. A. McLEAN,
EARL T. FRASER.